US012730471B2

(12) United States Patent
Yamashita et al.

(10) Patent No.: US 12,730,471 B2
(45) Date of Patent: Sep. 8, 2026

(54) BAND GAP POWER SUPPLY CIRCUIT

(71) Applicant: Mitsubishi Electric Corporation, Tokyo (JP)

(72) Inventors: Shimpei Yamashita, Tokyo (JP); Sho Ikeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 167 days.

(21) Appl. No.: 18/907,041

(22) Filed: Oct. 4, 2024

(65) Prior Publication Data

US 2025/0030342 A1 Jan. 23, 2025

Related U.S. Application Data

(63) Continuation of application No. PCT/JP2022/022244, filed on Jun. 1, 2022.

(51) Int. Cl.

| | |
|---|---|
| ***H02M 3/158*** | (2006.01) |
| ***G05F 3/30*** | (2006.01) |
| *G05F 3/24* | (2006.01) |
| *G05F 3/26* | (2006.01) |
| *H02M 1/36* | (2007.01) |

(52) U.S. Cl.

CPC .............. *G05F 3/30* (2013.01); *H02M 3/158* (2013.01); *G05F 3/24* (2013.01); *G05F 3/26* (2013.01); *H02M 1/36* (2013.01)

(58) Field of Classification Search

CPC .... G05F 3/30; G05F 3/24; G05F 3/26; H02M 3/158; H02M 1/36

See application file for complete search history.

(56) References Cited

U.S. PATENT DOCUMENTS

| | | | | |
|---|---|---|---|---|
| 8,294,449 | B2 | 10/2012 | Ide | |
| 8,653,806 | B2 | 2/2014 | Ide | |
| 2013/0154604 | A1 * | 6/2013 | Sugiura | G05F 3/30 323/313 |

FOREIGN PATENT DOCUMENTS

| | | | |
|---|---|---|---|
| JP | 5543090 | B2 | 7/2014 |

OTHER PUBLICATIONS

Banba et al., "A CMOS Bandgap Reference Circuit with Sub-1-V Operation", IEEE Journal of Solid-State Circuits, May 1999, vol. 34, No. 5, p. 670-674.

International Search Report, issued in PCT/JP2022/022244, PCT/ISA/210, dated Jul. 19, 2022.

* cited by examiner

*Primary Examiner* — Crystal L Hammond
*Assistant Examiner* — Jonathan Walter Soileau
(74) *Attorney, Agent, or Firm* — Birch, Stewart, Kolasch & Birch, LLP

(57) ABSTRACT

Disclosed is a band gap power supply circuit including a band gap core circuit to perform control in such a way that the sum of a current flowing through a diode and a current flowing through a first current path becomes equal to the sum of a current flowing through a diode and a current flowing through a second current path, and the sum of the forward direction voltage of the diode and a voltage drop across a resistor becomes equal to the forward direction voltage of the diode; and a switch control circuit to control a switch and a switch from off to on at a time of a startup of a power supply.

5 Claims, 6 Drawing Sheets

1
2
3
4
VDD
VSS
GND
Vref
MP1
MP2
MP3
MP4
MP5
MP6
MN1
MN2
MN3
OP1
R1
R2
R3
R4
R5
D1
D2
SW1
SW2
V1
V2
$I_3$
$I_{2b}$
$I_{2a}$
$I_{1a}$
$I_{1b}$
$dV_f$
$V_{f2}$
$V_{f1}$
Switch
Control Circuit 1A
3A
5
2A
VDD
VSS
Vref
MP1
MP2
MP3
MP4
MP5
MP6
MN1
MN2
MN3
MN4
MN5
OP1
R1
R2
R3
R4
R5
R6
C1
D1
D2
V1
V2
$I_{1a}$
$I_{1b}$
$I_{2a}$
$I_{2b}$
$I_3$
$dV_f$
$V_{f1}$
$V_{f2}$

BAND GAP POWER SUPPLY CIRCUIT

CROSS REFERENCE TO RELATED APPLICATION

This application is a Continuation of PCT International Application No. PCT/JP2022/022244, filed on Jun. 1, 2022, which is hereby expressly incorporated by reference into the present application.

TECHNICAL FIELD

The present disclosure relates to a band gap power supply circuit.

BACKGROUND ART

A band gap power supply circuit is widely used for various types of a large scale integration (LSI), and includes a band gap core circuit which generates a reference voltage, and a startup circuit for starting up the band gap core circuit. Conventionally, various proposals for lowering a reference voltage generated by a band gap power supply circuit have been provided.

For example, in Nonpatent Literature 1, a band gap power supply circuit in which a band gap core circuit has an output voltage of approximately 1.2V is described. The band gap core circuit includes an operational amplifier OP1 which is a differential amplifier circuit, a diode D1, a diode D2, a transistor MP1, a transistor MP2, a transistor MP3, a resistor R1, a resistor R2, a resistor R3, and a resistor R4.

Each of the gate terminals of the transistors MP1 to MP3 is connected to the output terminal of the operational amplifier OP1. The anode terminal of the diode D1 in a parallel circuit of the diode D1 and the resistor R1 is connected to the positive input terminal of the operational amplifier OP1, and the cathode terminal of the diode D1 in the parallel circuit is made to have a ground potential VSS. The drain terminal of the transistor MP1 is connected to the positive input terminal of the operational amplifier OP1 and the anode terminal of the diode D1.

The anode terminal of the diode D2 is connected, via the resistor R3, to the negative input terminal of the operational amplifier OP1, and the resistor R2 is connected in parallel to a current path in which the diode D2 and the resistor R3 are connected in series. The cathode terminal of the diode D2 and a terminal of the resistor R2 are made to have the ground potential VSS. The drain terminal of the transistor MP2 is connected to the negative input terminal of the operational amplifier OP1 and the resistor R3 in the above-mentioned current path. The junction area of the diode D1 is smaller than that of the diode D2.

A terminal of the resistor R4 and the drain terminal of the transistor MP3 are connected to an output terminal of the band gap core circuit. The other terminal of the resistor R4 is made to have the ground potential VSS. A power supply voltage VDD is supplied to each of the source terminals of the transistors MP1 to MP3.

The operational amplifier OP1 controls the currents flowing through the diodes D1 and D2 in such a way that the sum of the forward direction voltage of the diode D2 having a larger junction area and a voltage drop across the resistor R3 connected in series to the diode D2 becomes equal to the forward direction voltage of the diode D1 having a small junction area. The startup circuit starts up the band gap core circuit, thereby bringing the band gap core circuit to a state in which a current flows through the band gap core circuit.

CITATION LIST

Nonpatent Literature

Nonpatent Literature 1: H. Banba et al., "A CMOS Bandgap Reference Circuit with Sub-1-V Operation" in IEEE Journal of Solid-State Circuits, Vol. 34, No. 5, May 1999, pp. 670-673.

SUMMARY OF INVENTION

Technical Problem

In the band gap core circuit, a state in which a current flows from the anode terminal toward the cathode terminal in both the diodes D1 and D2 (on state), and in which currents also flow through the resistors R1 and R2 is a normal operation one. However, a problem with the band gap core circuit described in Nonpatent Literature 1 is that, in the course from a startup of the power supply which supplies a power supply voltage to the above-mentioned normal operation state, the band gap core circuit passes through an abnormal operation state in which both the diodes D1 and D2 are in an off state, but currents flow through the resistors R1 and R2.

The present disclosure is made to solve the above-mentioned problem, and it is therefore an object of the present disclosure to provide a band gap power supply circuit that can make a transition to a normal operation state without passing through an abnormal operation state.

Solution to Problem

A band gap power supply circuit according to the present disclosure includes: a band gap core circuit having a first switch to make up a first current path in which a first resistor is connected in series to the first switch, and to turn on and off an electrical connection between the first resistor and a ground potential, a first rectifier element connected in parallel to the first current path, a second switch to make up a second current path in which a second resistor is connected in series to the second switch, and to turn on and off an electrical connection between the second resistor and the ground potential, and a second rectifier element to make up a current path in which a third resistor is connected in series to the second rectifier element, the current path being connected in parallel to the second current path, to perform control in such a way that the sum of a current flowing through the first rectifier element and a current flowing through the first current path becomes equal to the sum of a current flowing through the second rectifier element and a current flowing through the second current path, and the sum of the forward direction voltage of the second rectifier element and a voltage drop across the third resistor becomes equal to the forward direction voltage of the first rectifier element; and a switch control circuit to control the first switch and the second switch from off to on at a time of a startup of a power supply to supply a power supply voltage.

Advantageous Effects of Invention

According to the present disclosure, the band gap core circuit performs the control in such a way that the sum of the current flowing through the first rectifier element and the current flowing through the first current path becomes equal to the sum of the current flowing through the second rectifier element and the current flowing through the second current path, and the sum of the forward direction voltage of the second rectifier element and the voltage drop across the third resistor becomes equal to the forward direction voltage of the first rectifier element. The switch control circuit controls the first switch and the second switch from off to on at a time of a startup of the power supply. As a result, the band gap power supply circuit according to the present disclosure can make a transition to a normal operation state without passing through an abnormal operation state.

DESCRIPTION OF EMBODIMENTS

Embodiment 1

Figure 1:
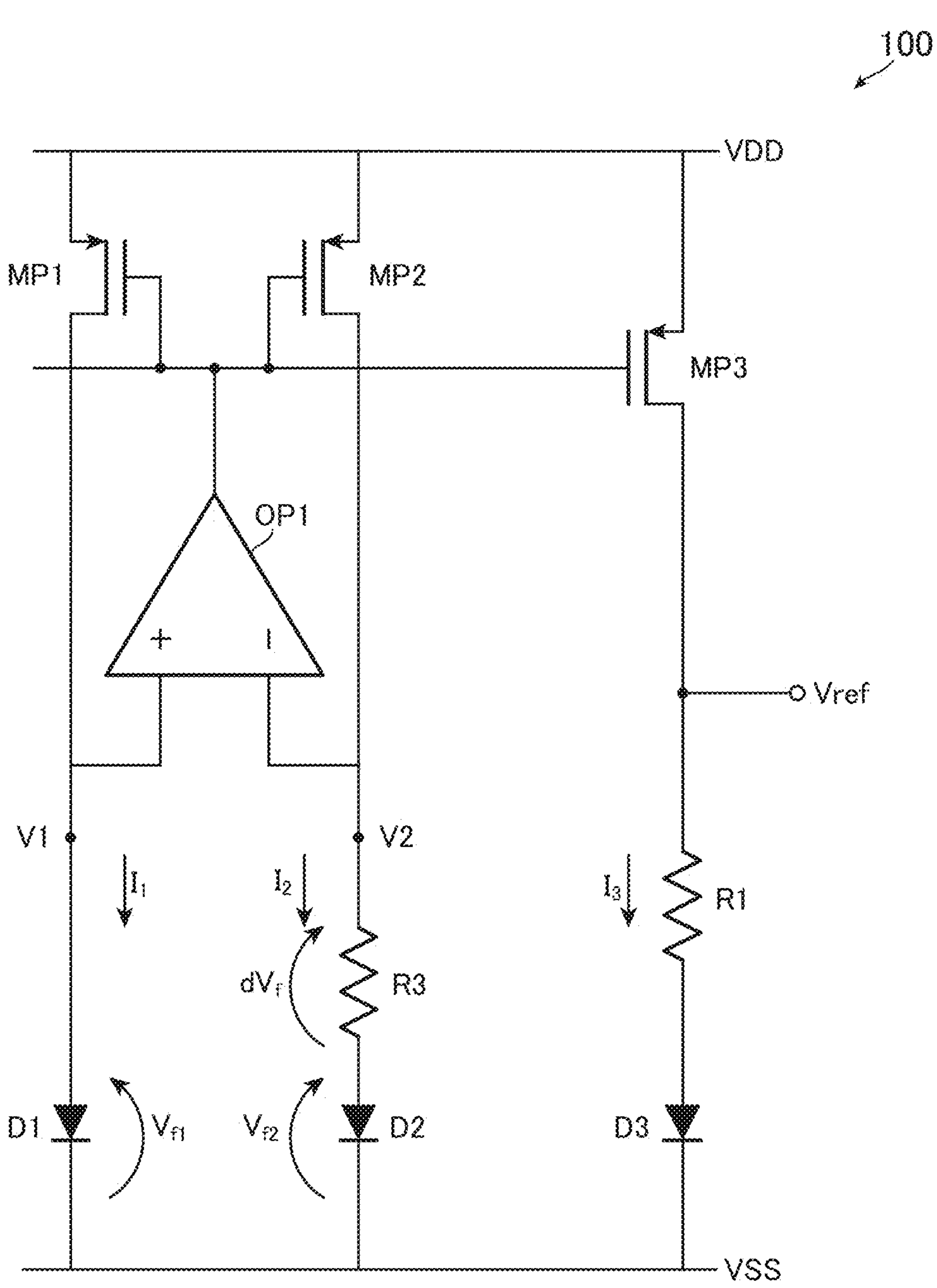
FIG. 1 is a circuit diagram showing the configuration of a conventional example (1) of a band gap core circuit.

A problem with conventional band gap power supply circuits will be explained in detail before an explanation of a band gap power supply circuit according to the present disclosure. FIG. 1 is a circuit diagram showing the configuration of a band gap core circuit 100 which is a conventional example (1). The band gap core circuit 100 is a conventional circuit which is started up by a startup circuit and which outputs a reference voltage $V_{ref}$ of approximately 1.2V As shown in FIG. 1, the band gap core circuit 100 includes an operational amplifier OP1, a resistor R1, a resistor R3, a diode D1, a diode D2, a diode D3, a transistor MP1, a transistor MP2, and a transistor MP3.

The diodes D1 and D3 are the same in device structure as each other, and the ratio of the junction area of the diode D1 to that of the diode D2 is N to 1. Here, N is an integer larger than 1. The transistors MP1, MP2, and MP3 are the same in device structure as each other, and P channel transistors are used as the transistors MP1, MP2, and MP3, for example. The transistors MP1, MP2, and MP3 are connected in parallel so as to make up a current mirror circuit.

Each of gate terminals of the transistors MP1, MP2, and MP3 is connected to an output terminal of the operational amplifier OP1. An anode terminal of the diode D1 and a drain terminal of transistor MP1 are connected to a positive input terminal of the operational amplifier OP1. Further, a cathode terminal of the diode D1 is made to have a ground potential VSS. A voltage V1 is applied to the positive input terminal of the operational amplifier OP1, and a current $I_1$ flows through the diode D1. A voltage between the terminals of the diode D1 is $V_{f1}$.

A drain terminal of the transistor MP2 is connected to a negative input terminal of the operational amplifier OP1, and an anode terminal of the diode D2 is further connected, via the resistor R3, to the negative input terminal of the operational amplifier OP1. A cathode terminal of the diode D2 is made to have the ground potential VSS. A voltage V2 is applied to the negative input terminal of the operational amplifier OP1, and a current $I_2$ flows through a current path in which the resistor R3 and the diode D2 are connected in series. A voltage between the terminals of the diode D2 is $V_{f2}$, and a voltage between terminals of the resistor R3 is $dV_f$. The voltage $dV_f$ is a voltage drop across the resistor R3.

A power supply voltage VDD is supplied to each of source terminals of the transistors MP1, MP2, and MP3. One terminal of the resistor R1 and a drain terminal of the transistor MP3 are connected to an output terminal of the band gap core circuit 100. In addition, an anode terminal of the diode D3 is connected to the other terminal of the resistor R1, and a cathode terminal of the diode D3 is made to have the ground potential VSS. A current $I_3$ flows through the resistor R1.

By virtue of the current mirror circuit which includes the transistors MP1, MP2, and MP3, and the operational amplifier OP1, a relation of $I_1=I_2=I_3$ holds for the currents, and a relation of V1=V2 holds for the voltages. The voltage $V_{f1}$ between the terminals of the diode D1, the voltage $V_{f2}$ between the terminals of the diode D2, and the voltage $dV_f$ between the terminals of the resistor R3 are expressed by the following equations (1), (2), and (3). In the following equations (1), (2), and (3), $V_T$ denotes a thermal voltage, $I_s$ denotes a reverse saturation current per unit area, and A denotes the junction area of the diode D1.

$$V_{f1} = V_T \cdot \ln\{I_1/(I_s \cdot A)\} \tag{1}$$

$$V_{f2} = V_T \cdot \ln\{I_2/(I_s \cdot N \cdot A)\} \tag{2}$$

$$dV_f = V_{f1} - V_{f2} = V_T \cdot \ln(N) \tag{3}$$

According to the above-mentioned equations (1), (2), and (3), the reference voltage $V_{ref}$ generated by the band gap core circuit 100 can be expressed by the following equation (4). Because the first term in the following equation (4) has a negative temperature coefficient and the second term in the following equation (4) has a positive temperature coefficient, these temperature coefficients can be canceled out by adjusting each parameter properly. The band gap core circuit 100 shown in FIG. 1 generates a reference voltage $V_{ref}$ of approximately 1.2V, and outputs the reference voltage $V_{ref}$ from the output terminal.

$$V_{ref} = V_{f1} + (R1/R3) \cdot V_T \cdot \ln(N) \tag{4}$$

Figure 2:
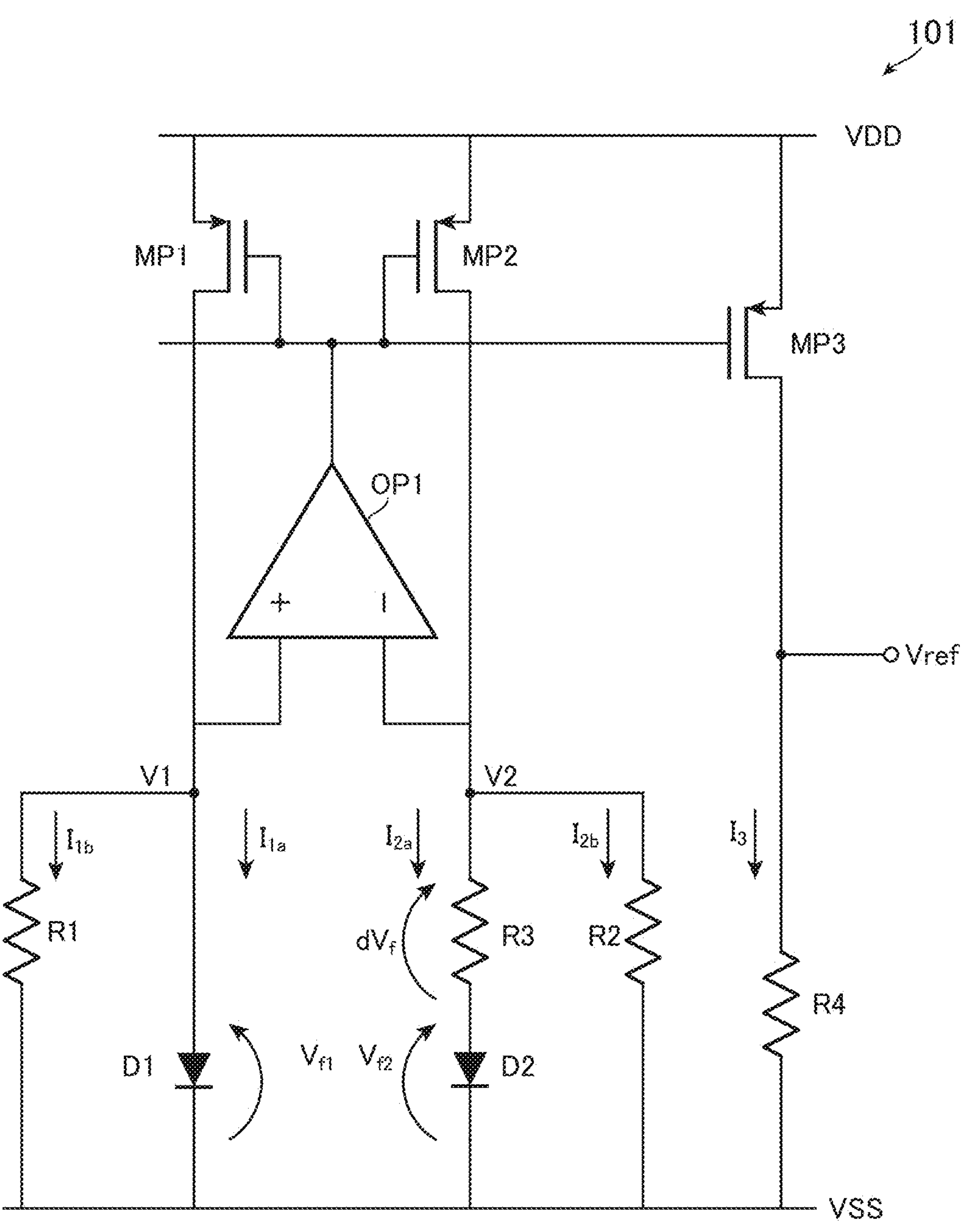
FIG. 2 is a circuit diagram showing the configuration of a conventional example (2) of the band gap core circuit.

FIG. 2 is a circuit diagram showing the configuration of a band gap core circuit 101 which is a conventional example (2). The band gap core circuit 101 is included in the band gap power supply circuit described in Nonpatent Literature 1. The band gap core circuit 101 is started up by a startup circuit, and outputs a reference voltage $V_{ref}$ of approximately 1.2V. As shown in FIG. 2, the band gap core circuit 101 includes an operational amplifier OP1, a resistor R1, a resistor R2, a resistor R3, a resistor R4, a diode D1, a diode D2, a transistor MP1, a transistor MP2, and a transistor MP3.

The diodes D1 and D2 are the same in device structure as each other, and the ratio of the junction area of the diode D1 to that of the diode D2 is N to 1, like in the case of the band gap core circuit 100. Here, N is an integer larger than 1. The transistors MP1, MP2, and MP3 are the same in device structure as each other, and P channel transistors are used as the transistors MP1, MP2, and MP3, for example. The transistors MP1, MP2, and MP3 are connected in parallel so as to make up a current mirror circuit.

Each of gate terminals of the transistors MP1, MP2, and MP3 is connected to an output terminal of the operational amplifier OP1. A terminal of the resistor R1, an anode terminal of the diode D1, and a drain terminal of the transistor MP1 are connected to a positive input terminal of the operational amplifier OP1. The other terminal of the resistor R1 and a cathode terminal of the diode D1 are made to have a ground potential VSS. When a voltage V1 is applied to the positive input terminal of the operational amplifier OP1, a current $I_{1a}$ flows through the diode D1 and a current $I_{1b}$ flows through the resistor R1. A voltage between the terminals of the diode D1 is $V_{f1}$.

A drain terminal of the transistor MP2 is connected to a negative input terminal of the operational amplifier OP1, and an anode terminal of the diode D2 is further connected, via the resistor R3, to the negative input terminal of the operational amplifier OP1. A cathode terminal of the diode D2 is made to have the ground potential VSS. The resistor R2 is connected in parallel to a current path in which the resistor R3 and the diode D2 are connected in series, with respect to the negative input terminal of the operational amplifier OP1. More specifically, one terminal of the resistor R2 is connected to the above-mentioned current path and the negative input terminal of the operational amplifier OP1, and the other terminal of the resistor R2 is made to have the ground potential VSS.

When a voltage V2 is applied to the negative input terminal of the operational amplifier OP1, a current $I_{2a}$ flows through the above-mentioned current path and a current $I_{2b}$ flows through the resistor R2. The voltage between the terminals of the diode D2 is $V_{f2}$, and the voltage between terminals of the resistor R3 is $dV_f$. The voltage $dV_f$ is a voltage drop across the resistor R3.

A power supply voltage VDD is supplied to each of source terminals of the transistors MP1, MP2, and MP3. One terminal of the resistor R4 and a drain terminal of the transistor MP3 are connected to an output terminal of the band gap core circuit 101. The other terminal of the resistor R4 is made to have the ground potential VSS. A current $I_3$ flows through the resistor R4.

By virtue of the current mirror circuit which includes the transistors MP1, MP2, and MP3, and the operational amplifier OP1, a relation of $I_{1a}+I_{1b}=I_{2a}+I_{2b}=I_3$ holds for the currents, and a relation of V1=V2 holds for the voltages. More specifically, also in the band gap core circuit 101, the relation among the above-mentioned equations (1), (2), and (3) holds.

The series circuit of the resistor R1 and the diode D3 in the band gap core circuit 100 is replaced by the resistor R4, in the band gap core circuit 101. In addition, the band gap core circuit 101 includes the resistor R1 connected in parallel to the diode D1, and the resistor R2 connected in parallel to the current path in which the resistor R3 and the diode D2 are connected in series. In the band gap core circuit 101, the current $I_{2a}$ flowing through the current path of the resistor R3 and the diode D2 is expressed by the following equation (5), and the current $I_{2b}$ flowing through the resistor R2 is expressed by the following equation (6).

$$I_{2a} = dV_f / R3 \quad (5)$$

$$I_{2b} = V_{f1} / R2 \quad (6)$$

When the current $I_3=I_{2a}+I_{2b}$ holds, and the resistance values of the resistors R1 and R2 are the same, the reference voltage $V_{ref}$ is expressed by the following equation (7). Because the coefficient part of (R4/R1) in the following equation (7) is the same as that of ($V_{ref}-V_{f1}$) in the above-mentioned equation (4), the reference voltage of approximately $V_{ref}$=0.6V is acquired by adjusting R4/R1 to approximately 0.5.

$$V_{ref} = R4 \cdot \{(V_{f1}/R2) + (dV_f/R3)\} = (R4/R1) \cdot \{V_{f1} + (R1/R3) \cdot dV_f\} \quad (7)$$

The conventional band gap core circuit 100 has the following two stable states (1) and (2).

(1) The state in which no current flows through the band gap core circuit 100.

(2) The state in which both the diodes D1 and D2 are in an on state, and a current flows through each of the following elements: the diodes D1 and D2 and the resistors R1 and R3.

In the band gap core circuit 100, the state (2) is a normal operation state. The startup circuit is used in order to avoid the state (1). More specifically, the state (1) is avoided by a startup of the band gap core circuit 100 by the startup circuit.

Further, the conventional band gap core circuit 101 has the following three stable states (1), (2), and (3), because of variations in the resistor R1 or R2.

(1) The state in which no current flows through the band gap core circuit 101.

(2) The state in which both the diodes D1 and D2 are in an off state, and a current flows through each of the resistors R1 and R2.

(3) The state in which both the diodes D1 and D2 are in an on state, and a current flows through each of the following elements: the diodes D1 and D2 and the resistors R1 and R2.

As mentioned above, in the band gap core circuit 101, the state (2) is an abnormal operation state, and the state (3) is a normal operation state. The startup circuit is used in order to avoid the state (1). More specifically, the state (1) is avoided by a startup of the band gap core circuit 101 by the startup circuit.

However, the occurrence of the state (2) cannot be prevented by the startup circuit. Therefore, when the band gap core circuit 101 is started up by the startup circuit, the band gap core circuit 101 makes a transition to the state (3) after passing through the state (2). In this case, there is a possibility that the band gap core circuit 101 enters the state (2) before a rise of the power supply voltage supplied from the power supply is complete.

Figure 3:
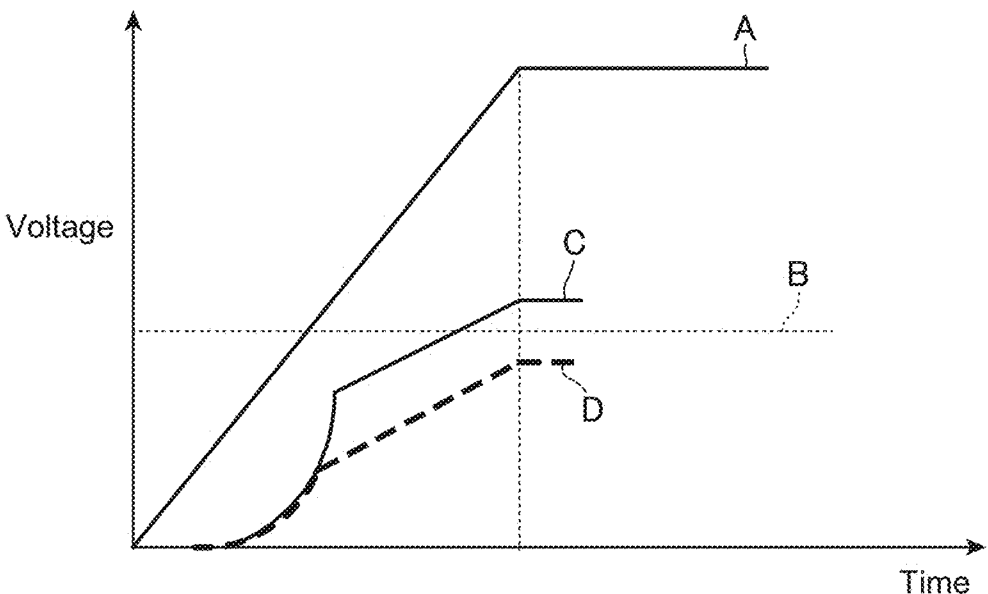
FIG. 3 is a graph showing the time waveforms of a voltage applied to a positive input terminal of an operational amplifier, a voltage applied to a negative input terminal of the operational amplifier, and a power supply voltage, the operational amplifier being included in the conventional band gap core circuit.

FIG. 3 is a graph showing the time waveforms of the voltage V1 applied to the positive input terminal of the operational amplifier OP1 which the band gap core circuit 101 includes, the voltage V2 applied to the negative input terminal of the operational amplifier OP1, and the power supply voltage VDD. In FIG. 3, the time waveform A of the power supply voltage VDD starts to rise after the power supply is started up by the startup circuit, and, when a certain time elapses, the rise is complete and the power supply voltage VDD becomes stable. The voltage B is the threshold voltage of the diodes D1 and D2.

The voltage V1 applied to the positive input terminal of the operational amplifier OP1 is also applied to the anode terminal of the diode DL. The voltage V2 applied to the negative input terminal of the operational amplifier OP1 is also applied to the current path in which the resistor R3 and the diode D2 are connected in series. When the voltage V1 of the anode terminal of the diode D1 becomes greater than or equal to the voltage B, the diode D1 enters the on state. Similarly, when the voltage V2 of the anode terminal of the diode D2 becomes greater than or equal to the voltage B, the diode D2 enters the on state.

The waveform C of the voltage V1 or V2 shows the one when the band gap core circuit 101 converges to the normal operation state. The band gap core circuit 101 enters the normal operation state in this way when the voltage V1 of the anode terminal of the diode D1 becomes greater than or equal to the voltage B before a rise of the power supply voltage VDD is complete, more specifically, before the power supply voltage VDD converges to a constant one.

The waveform D of the voltage V1 or V2 shows the one when the band gap core circuit 101 converges to the abnormal operation state. It is clear from the waveform D that, in the abnormal operation state, the voltage V1 of the anode terminal of the diode D1 does not become greater than or equal to the voltage B before a rise of the power supply voltage VDD is complete. In this case, currents start to flow through the resistors R1 and R2 before the power supply voltage VDD rises, and, even after the rise of the power supply voltage VDD is complete, the voltage V1 or V2 does not become greater than or equal to the voltage B and therefore it takes time to converge to the normal operation state, as shown in FIG. 3.

Accordingly, in a band gap power supply circuit according to Embodiment 1, control is performed in such a way that, in the process of starting up the band gap power supply circuit, i.e., at a time of a startup of a power supply, currents are prevented from flowing through resistors R1 and R2, and currents are made to flow through resistors R1 and R2 after a rise of a power supply voltage VDD is complete. As a result, the band gap power supply circuit according to Embodiment 1 can make a transition to the state (3) which is a normal operation state without passing through the state (2) which is an abnormal operation state.

Figure 4:
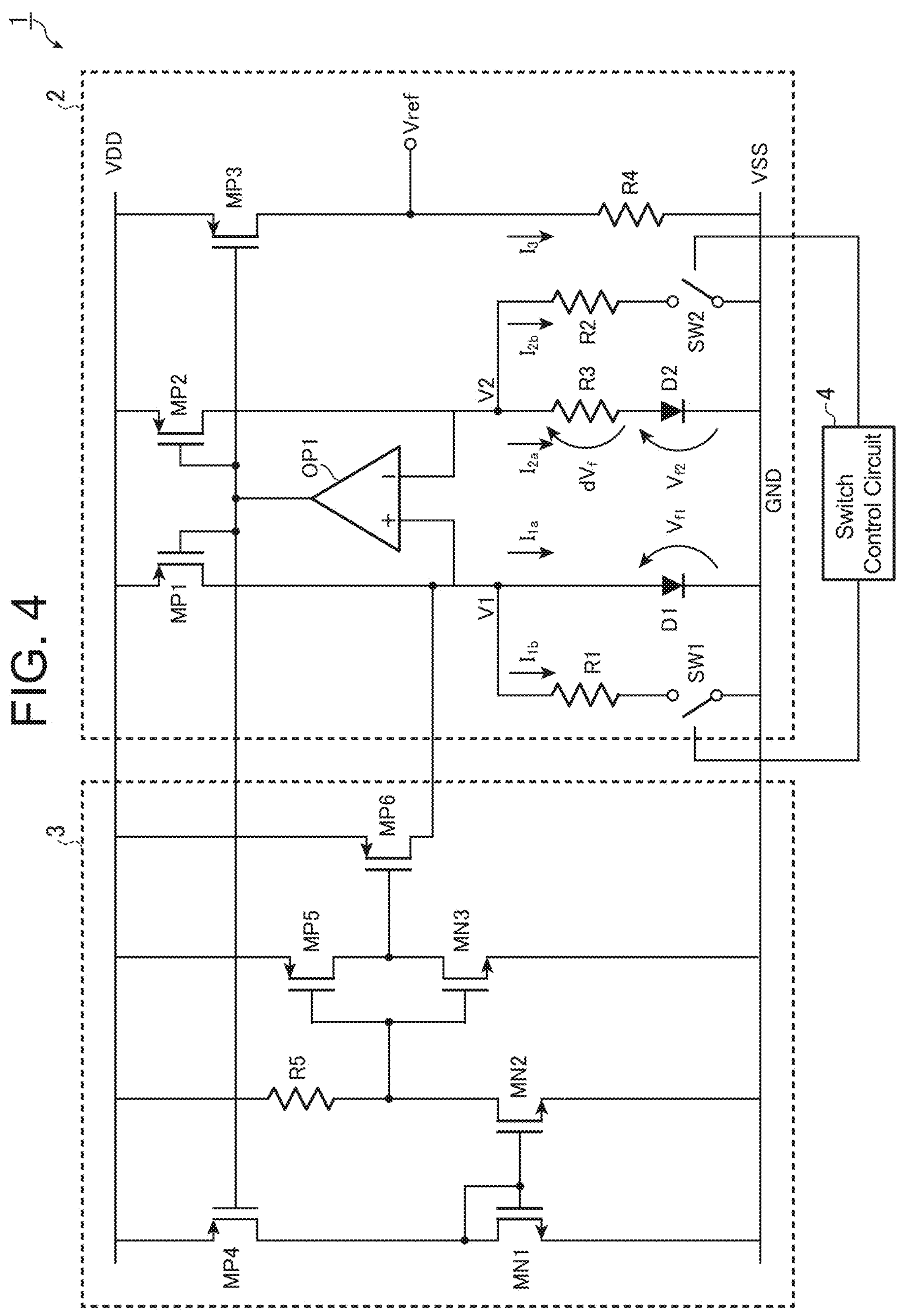
FIG. 4 is a circuit diagram showing the configuration of a band gap power supply circuit according to Embodiment 1.

FIG. 4 is a circuit diagram showing the configuration of the band gap power supply circuit 1 according to Embodiment 1. In FIG. 4, the band gap power supply circuit 1 generates a reference voltage $V_{ref}$ on the basis of the power supply voltage VDD, and includes a band gap core circuit 2, a startup circuit 3, and a switch control circuit 4. The band gap core circuit 2 is configured so as to include an operational amplifier OP1, a transistor MP1, a transistor MP2, a transistor MP3, a diode D1, a diode D2, the resistor R1, the resistor R2, a resistor R3, a resistor R4, a switch SW1, and a switch SW2.

The switch SW1 is a first one which makes up a first current path with the resistor R1 which is a first resistor and connected in series to the switch SW1, and the switch SW1 turns on and off an electrical connection between the resistor R1 and a ground potential VSS. The first current path is a series circuit in which the resistor R1 and the switch SW1 are connected in series. One end of the resistor R1 is connected to a positive input terminal (+) of the operational amplifier OP1, and the other end of the resistor R1 is connected to the switch SW1. When the switch SW1 is in an on state, an electrical connection between the resistor R1 and the ground potential VSS is made, and when the switch SW1 is in an off state, the resistor R1 is disconnected from the ground potential VSS.

The switch SW2 is a second one which makes up a second current path with the resistor R2 which is a second resistor and connected in series to the switch SW2, and the switch SW2 turns on and off an electrical connection between the resistor R2 and the ground potential VSS. The second current path is a series circuit in which the resistor R2 and the switch SW2 are connected in series. One end of the resistor R2 is connected to a negative input terminal (−) of the operational amplifier OP1, and the other end of the resistor R2 is connected to the switch SW2. When the switch SW2 is in an on state, an electrical connection between the resistor R2 and the ground potential VSS is made, and when the switch SW2 is in an off state, the resistor R2 is disconnected from the ground potential VSS.

The diode D1 is a first rectifier element which is connected in parallel to the above-mentioned first current path. For example, the diode D1 is a first one having a cathode terminal which is connected to a ground GND so as to have the ground potential VSS, and an anode terminal which is connected to one end of the resistor R1 and the positive input terminal of the operational amplifier OP1.

The diode D2 is a second rectifier element which makes up a current path in which the resistor R3 is a third resistor and connected in series to the diode D2, and this current path is connected in parallel to the above-mentioned second current path. One end of the resistor R3 is connected to the negative input terminal of the operational amplifier OP and one end of the resistor R2. The diode D2 is a second one having an anode terminal which is connected to the other end of the resistor R3, and a cathode terminal which is electrically connected to the ground GND so as to have the ground potential VSS.

The transistors MP1, MP2, and MP3 are first, second and third transistors that are the same in device structure as each other, and P channel transistors are used as the transistors, for example. Each of the transistors MP1, MP2, and MP3 which are P channel transistors has a gate terminal which is a control terminal, a source terminal which is a first terminal, and a drain terminal which is a second terminal. In each of the transistors MP1, MP2, and MP3, an electrical connection between the source terminal and the drain terminal is made by a control voltage applied to the gate terminal.

Further, the transistors MP1, MP2, and MP3 are connected in parallel so as to make up a current mirror circuit.

The diodes D1 and D2 are the same in device structure as each other, and the ratio of the junction area of the diode D1 to that of the diode D2 is N to 1. N is an integer larger than 1.

The diode D1 having a smaller junction area has a cathode terminal which is made to have the ground potential VSS, and an anode terminal which is connected to the drain terminal of the transistor MP1. A not-illustrated power supply is connected to the source terminal of the transistor MP1, and the power supply voltage VDD is supplied to the source terminal of the transistor MP1 from the power supply.

The diode D2 having a larger junction area has a cathode terminal which is made to have the ground potential VSS, and an anode terminal which is connected, via the resistor R3, to the drain terminal of the transistor MP2. The above-mentioned power supply is connected to the source terminal of the transistor MP2, and the power supply voltage VDD is supplied to the source terminal of the transistor MP2 from the power supply.

The operational amplifier OP1 is a differential amplifier circuit which controls the currents flowing through the diodes D1 and D2 in such a way that the sum of the forward direction voltage $V_{f2}$ of the diode D2 and a voltage drop $dV_f$ across the resistor R3 connected in series to the diode D2 becomes equal to the forward direction voltage $V_{f1}$ of the diode D1.

One end of the resistor R4 is connected to the ground GND so as to have the ground potential VSS, and the other end of the resistor R4 is connected to the drain terminal of the transistor MP3 and an output terminal of the band gap core circuit 2. More specifically, the band gap power supply circuit 1 outputs the reference voltage $V_{ref}$ from a point of connection between the transistor MP3 and the resistor R4.

The startup circuit 3 is intended to start up the band gap core circuit 2 to prevent the band gap core circuit 2 from entering the above-mentioned state (1) in which no current flows through the band gap core circuit 2. The startup circuit 3 is configured so as to include a resistor R5, a transistor MP4, a transistor MP5, a transistor MP6, a transistor MN1, a transistor MN2, and a transistor MN3. In the startup circuit 3, the transistors MP4, MP5, and MP6 are P channel transistors. The transistors MN1, MN2, and MN3 are N channel transistors.

The transistor MP4 has a gate terminal which is connected to each of the gate terminals of the transistors MP1, MP2, and MP3, and a source terminal which is connected to the above-mentioned power supply and to which the power supply voltage VDD is supplied. A drain terminal of the transistor MP4 is connected to a drain terminal of the transistor MN1. The transistor MN1 has a gate terminal which is connected to a gate terminal of the transistor MN2, and a source terminal which is connected to the ground GND so as to have the ground potential VSS. The transistors MP4 and MN1 make up a bias circuit.

One end of the resistor R5 is connected to the above-mentioned power supply and to which the power supply voltage VDD is supplied, and the other end of the resistor R5 is connected to a drain terminal of the transistor MN2. A source terminal of the transistor MN2 is connected to the ground GND so as to have the ground potential VSS. The resistor R5 and the transistor MN2 make up a current to voltage conversion circuit.

The transistor MP5 has a gate terminal which is connected to a gate terminal of the transistor MN3, a source terminal which is connected to the above-mentioned power supply and to which the power supply voltage VDD is supplied, and a drain terminal which is connected to a drain terminal of the transistor MN3. The transistor MN3 has a source terminal which is connected to ground GND so as to have the ground potential VSS. The gate terminal of the transistor MP5 and the gate terminal of the transistor MN3 are connected to a point of connection between the resistor R5 and the drain terminal of the transistor MN2. The drain terminal of the transistor MP5 and the drain terminal of the transistor MN3 are connected to a gate terminal of the transistor MP6.

The transistors MP5 and MN3 make up an inverter. The inverter receives the voltage (drain voltage) of the drain terminal of the transistor MN2, and has an output point which is a point of connection between the drain terminal of the transistor MP5 and the drain terminal of the transistor MN3. The transistor MP6 has a source terminal which is connected to the above-mentioned power supply and to which the power supply voltage VDD is supplied, and a drain terminal which is connected to the anode terminal of the diode D2 of the band gap core circuit 2. The above-mentioned inverter and the transistor MP6 make up a startup bias circuit.

The switch control circuit 4 controls the switches SW1 and SW2 from off to on at a time of a startup of the above-mentioned power supply. For example, when the startup circuit 3 starts up the band gap core circuit 2, the above-mentioned power supply starts up and a rise of the power supply voltage VDD starts. The switch control circuit 4 brings both the switches SW1 and SW2 to an off state before the rise of the power supply voltage VDD is complete and the power supply voltage VDD converges to a constant one.

When both the switches SW1 and SW2 enter the off state, no currents flow through the resistors R1 and R2, and the waveforms of the voltages V1 and V2 rise rapidly and exceed a threshold voltage B shown in FIG. 3. After the voltages V1 and V2 exceed the threshold voltage B, the switch control circuit 4 brings both the switches SW1 and SW2 to an on state. As a result, the waveforms of the voltages V1 and V2 converge to voltages exceeding the threshold voltage B. More specifically, the band gap power supply circuit 1 can become the state (3) without passing through the state (2), at a time of a startup of the above-mentioned power supply, more specifically, before a rise of the power supply voltage VDD is complete.

The configuration of the startup circuit 3 shown in FIG. 4 is an example, and the startup circuit may have a configuration different from that shown in FIG. 4 as long as the startup circuit can start up the band gap core circuit 2.

Further, although the configuration in which the operational amplifier OP1 is used in the band gap core circuit 2 is shown, a self-biased current mirror circuit may be used instead of the operational amplifier OP1.

For example, this current mirror circuit may employ not-illustrated transistors MN4*a* and MN5*a*, in addition to the transistors MP1 and MP2, in FIG. 4. In the current mirror circuit, the gate terminals of the transistors MP1 and MP2 which are P channel transistors are connected to the gate terminals of the transistor MP3 and MP4 shown in FIG. 4, and the source terminals are connected to the above-mentioned power supply and the power supply voltage VDD is supplied to the source terminals. The drain terminal of the transistor MP1 is connected to a drain terminal of the transistor MN4*a* which is an N channel transistor, and the drain terminal of the transistor MP2 is connected to a drain terminal of the transistor MN5*a* which is an N channel transistor. Agate terminal of the transistor MN4*a* and a gate terminal of the transistor MN5*a* are connected.

A source terminal of the transistor MN4*a* corresponds to the positive input terminal of the operational amplifier OP1, and is connected to the parallel circuit of the first current path and the diode D1. A source terminal of the transistor MN5*a* corresponds to the negative input terminal of the operational amplifier OP1, and is connected to the parallel circuit of the second current path and the current path which includes the resistor R3 and the diode D1.

Even the band gap power supply circuit 1 which is configured in this way can make a transition to the normal operation state without passing through the abnormal operation state.

Further, the diodes D1 and D2 may be PNP bipolar junction transistors.

As mentioned above, the band gap power supply circuit 1 according to Embodiment 1 includes: the band gap core circuit 2 to perform control in such a way that the sum of the current $I_{1a}$ flowing through the diode D1 and the current $I_{1b}$ flowing through the first current path becomes equal to the sum of the current $I_{2a}$ flowing through the diode D2 and the current $I_{2b}$ flowing through the second current path, and the sum of the forward direction voltage $V_{f2}$ of the diode D2 and the voltage drop $dV_f$ across the resistor R3 becomes equal to the forward direction voltage $V_{f1}$ of the diode D1; and the switch control circuit 4 to control the switches SW1 and SW2 from off to on at a time of a startup of the power supply. As a result, the band gap power supply circuit 1 can make a transition to the normal operation state without passing through the abnormal operation state.

In the band gap power supply circuit 1, the band gap core circuit 2 has the operational amplifier OP1, and the transistors MP1, MP2, and MP3 each of which has a gate terminal connected to the output terminal of the operational amplifier OP1. The diode D1 has an anode terminal which is connected to the positive input terminal of the operational amplifier OP1 and the drain terminal of the transistor MP1, and a cathode terminal which is made to have the ground potential VSS. The first current path is connected in parallel to the diode D1, between the positive input terminal of the operational amplifier OP1 and the ground potential VSS, and the second current path is disposed between the negative input terminal of the operational amplifier OP1 and the ground potential VSS. The diode D2 has an anode terminal which is connected, via the resistor R3, to the negative input terminal of the operational amplifier OP1 and the drain terminal of the transistor MP2, and a cathode terminal which is made to have the ground potential VSS. The operational amplifier OP1 performs control in such a way that the sum of the current $I_{1a}$ flowing through the diode D1 and the current $I_{1b}$ flowing through the first current path becomes equal to the sum of the current $I_{2a}$ flowing through the diode D2 and the current $I_{2b}$ flowing through the second current path, and the sum of the forward direction voltage $V_{f2}$ of the diode D2 and the voltage drop $dV_f$ across the resistor R3 becomes equal to the forward direction voltage $V_{f1}$ of the diode D1. As a result, the band gap power supply circuit 1 can make a transition to the normal operation state without passing through the abnormal operation state.

In the band gap power supply circuit 1, the switch control circuit 4 turns off both the switches SW1 and SW2 before a rise of the power supply voltage VDD is complete at a time of a startup of the power supply, and turns on both the switches SW1 and SW2 after a rise of the power supply voltage VDD is complete at a time of a startup of the power supply. As a result, the band gap power supply circuit 1 can make a transition to the normal operation state without passing through the abnormal operation state.

Embodiment 2

Figure 5:
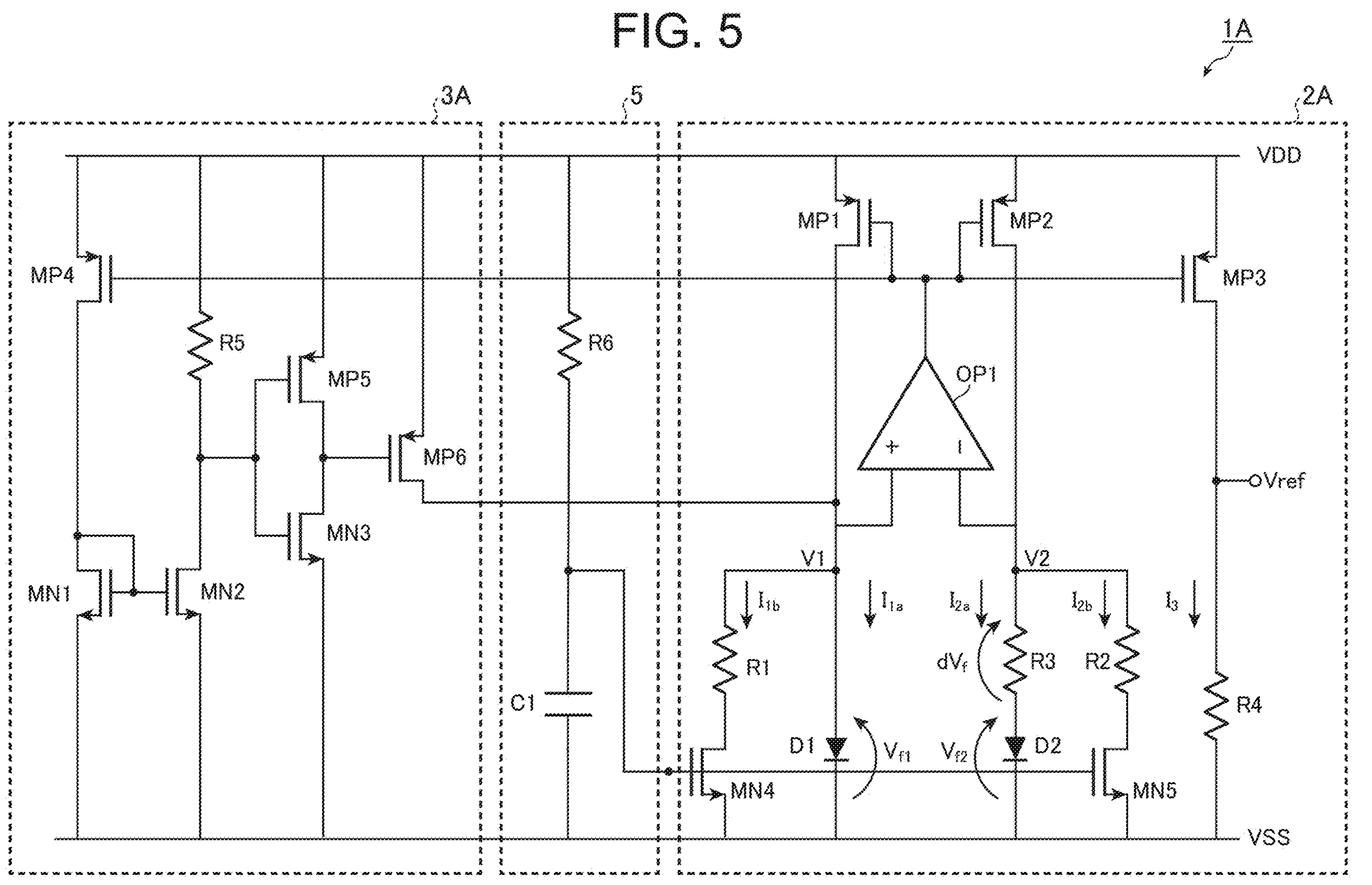
FIG. 5 is a circuit diagram showing the configuration of a band gap power supply circuit according to Embodiment 2.

FIG. 5 is a circuit diagram showing the configuration of a band gap power supply circuit 1A according to Embodiment 2. In FIG. 5, the band gap power supply circuit 1A is configured so as to include a band gap core circuit 2A, a startup circuit 3A, and a low pass filter 5 (referred to as LPF 5 hereinafter). The band gap core circuit 2A is configured so as to include an operational amplifier OP1, a transistor MP1, a transistor MP2, a transistor MP3, a diode D1, a diode D2, a resistor R1, a resistor R2, a resistor R3, a resistor R4, a transistor MN4, and a transistor MN5.

The transistor MN4 which is an N channel transistor is a first switch which makes up a first current path with the resistor R1 connected in series to a drain terminal thereof, and which turns on and off an electrical connection between the resistor R1 and a ground potential VSS. The first current path is a series circuit in which the resistor R1 and the transistor MN4 are connected in series. One end of the resistor R1 is connected to a positive input terminal (+) of the operational amplifier OP1, and the other end of the resistor R1 is connected to the transistor MN4. When the transistor MN4 is in an on state, an electrical connection between the resistor R1 and the ground potential VSS is made, and when the transistor MN4 is in an off state, the resistor R1 is disconnected from the ground potential VSS.

The transistor MN5 which is an N channel transistor is a second switch which makes up a second current path with the resistor R2 connected in series to a drain terminal thereof, and which turns on and off an electrical connection between the resistor R2 and the ground potential VSS. The second current path is a series circuit in which the resistor R2 and the transistor MN5 are connected in series. One end of the resistor R2 is connected to a negative input terminal (−) of the operational amplifier OP1, and the other end of the resistor R2 is connected to the transistor MN5. When the transistor MN5 is in an on state, an electrical connection between the resistor R2 and the ground potential VSS is made, and when the transistor MN5 is in an off state, the resistor R2 is disconnected from the ground potential VSS.

The diode D1 is a first rectifier element which is connected in parallel to the above-mentioned first current path. For example, the diode D1 is a first diode having a cathode terminal which is connected to a ground GND so as to have the ground potential VSS, and an anode terminal which is connected to one end of the resistor R1 and the positive input terminal of the operational amplifier OP1.

The diode D2 is a second rectifier element which makes up a current path in which the resistor R3 is connected in series, and this current path is connected in parallel to the above-mentioned second current path. The negative input terminal of the operational amplifier OP and one end of the resistor R2 are connected to one end of the resistor R3. The diode D2 is a second diode having an anode terminal which is connected to the other end of the resistor R3, and a cathode terminal which is electrically connected to the ground GND so as to have the ground potential VSS.

The transistors MP1, MP2, and MP3 are first, second and third transistors that are the same in device structure as each other, and P channel transistors are used as the transistors, for example. Each of the transistors MP1, MP2, and MP3 which are P channel transistors has a gate terminal which is a control terminal, a source terminal which is a first terminal, and a drain terminal which is a second terminal. In each of the transistors MP1, MP2, and MP3, an electrical connection between the source terminal and the drain terminal is made by a control voltage applied to the gate terminal.

Further, the transistors MP1, MP2, and MP3 are connected in parallel so as to make up a current mirror circuit.

The diodes D1 and D2 are the same in device structure as each other, and the ratio of the junction area of the diode D1 to that of the diode D2 is N to 1. N is an integer larger than 1.

The diode D1 having a smaller junction area has a cathode terminal which is made to have the ground potential VSS, and an anode terminal which is connected to the drain terminal of the transistor MP1. A not-illustrated power supply is connected to the source terminal of the transistor MP1, and a power supply voltage VDD is supplied to the source terminal of the transistor MP1 from this power supply.

The diode D2 having a larger junction area has a cathode terminal which is made to have the ground potential VSS, and an anode terminal which is connected, via the resistor R3, to the drain terminal of the transistor MP2. The above-mentioned power supply is connected to the source terminal of the transistor MP2, and the power supply voltage VDD is supplied to the source terminal of the transistor MP2 from the power supply.

The operational amplifier OP1 is a differential amplifier circuit which controls the currents flowing through the diodes D1 and D2 in such a way that the sum of the forward direction voltage $V_{f2}$ of the diode D2 and a voltage drop $dV_f$ across the resistor R3 to which the diode D2 is connected in series becomes equal to the forward direction voltage $V_{f1}$ of the diode D1.

One end of the resistor R4 is connected to the ground GND so as to have the ground potential VSS, and the other end of the resistor R4 is connected to the drain terminal of the transistor MP3 and an output terminal of the band gap core circuit 2. More specifically, the band gap power supply circuit 1A outputs a reference voltage $V_{ref}$ from a point of connection between the transistor MP3 and the resistor R4.

The startup circuit 3A is intended to start up the band gap core circuit 2A to prevent the band gap core circuit 2A from entering the above-mentioned state (1) in which no current flows through the band gap core circuit 2A. The startup circuit 3A is configured so as to include a resistor R5, a transistor MP4, a transistor MP5, a transistor MP6, a transistor MN1, a transistor MN2, and a transistor MN3. More specifically, the startup circuit 3A is configured in the same way as the startup circuit 3, and functions in the same manner as the startup circuit 3.

The LPF 5 is a switch control circuit which receives the power supply voltage VDD and which performs on/off control on the transistors MN4 and MN5 using an output signal, and is a series circuit in which a resistor R6 and a capacitor C1 are connected in series. One end of the resistor R6 is connected to the above-mentioned power supply and to which the power supply voltage VDD is supplied, and the other end of the resistor R6 is connected to the capacitor C1. One end of the capacitor C1 is connected to the resistor R6, and the other end of the capacitor C1 is connected to the ground GND so as to have the ground potential VSS. A point of connection between the resistor R6 and the capacitor C1 is an output point of the LPF 5, and this output point is connected to each of the gate terminals of the transistors MN4 and MN5.

The LPF 5 controls the transistors MN4 and MN5 from off to on at a time of a startup of the above-mentioned power supply. For example, when the startup circuit 3A starts up the band gap core circuit 2A, the above-mentioned power supply starts up and a rise of the power supply voltage VDD starts. The LPF 5 brings both the transistors MN4 and MN5 to the off state before the rise of the power supply voltage VDD is complete and the power supply voltage VDD converges to a constant voltage.

When both the transistors MN4 and MN5 enter the off state, no currents flow through the resistors R1 and R2, and the waveforms of voltages V1 and V2 rise rapidly and exceed the threshold voltage B shown in FIG. 3. After the voltages V1 and V2 exceed the threshold voltage B, the LPF 5 brings both the transistors MN4 and MN5 to the on state. As a result, the waveforms of the voltages V1 and V2 converge to a voltage exceeding the threshold voltage B. More specifically, the band gap power supply circuit 1A can become the state (3) without passing through the state (2), before a rise of the power supply voltage VDD is complete.

The configuration of the startup circuit 3A shown in FIG. 5 is an example, and the startup circuit may have a configuration different from that shown in FIG. 5 as long as the startup circuit can start up the band gap core circuit 2A.

Further, although the configuration in which the operational amplifier OP1 is used in the band gap core circuit 2A is shown, a self-biased current mirror circuit explained in Embodiment 1 may be used instead of the operational amplifier OP1.

Further, the diodes D1 and D2 may be PNP bipolar junction transistors.

As mentioned above, the band gap power supply circuit 1A according to Embodiment 2 includes the LPF 5 which functions as the switch control circuit 4. The LPF 5 receives the power supply voltage VDD, and performs on/off control on the switches SW1 and SW2 using the output signal. For example, the LPF 5 turns off both the switches SW1 and SW2 before a rise of the power supply voltage VDD is complete at a time of a startup of the power supply, and turns on both the switches SW1 and SW2 after a rise of the power supply voltage VDD is complete at a time of a startup of the power supply. As a result, the band gap power supply circuit 1A can make a transition to a normal operation state without passing through an abnormal operation state.

Embodiment 3

Figure 6:
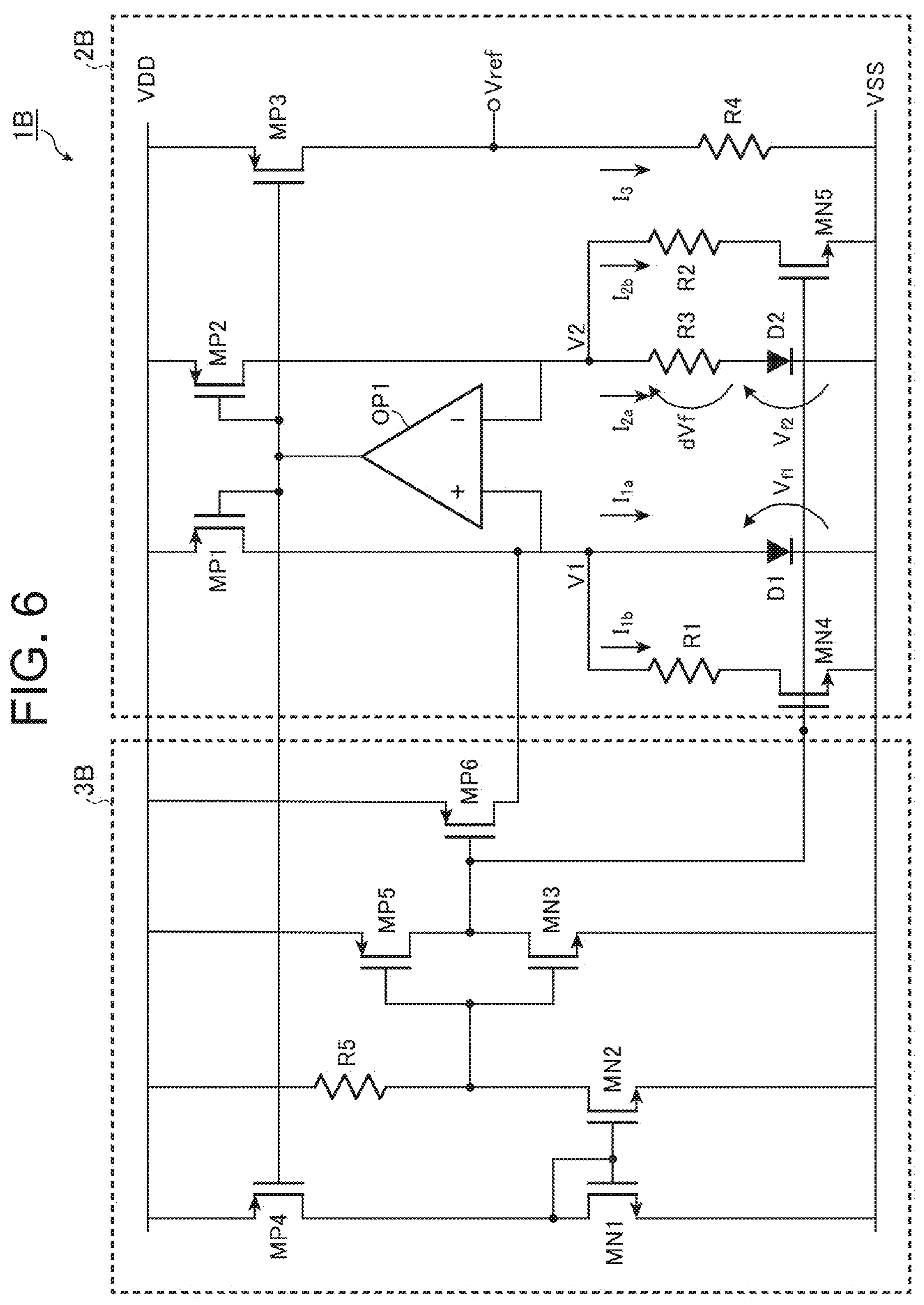
FIG. 6 is a circuit diagram showing the configuration of a band gap power supply circuit according to Embodiment 3.

FIG. 6 is a circuit diagram showing the configuration of a band gap power supply circuit 1B according to Embodiment 3. In FIG. 6, the band gap power supply circuit 1B is configured so as to include a band gap core circuit 2B and a startup circuit 3B. The band gap core circuit 2B is configured so as to include an operational amplifier OP1, a transistor MP1, a transistor MP2, a transistor MP3, a diode D1, a diode D2, a resistor R1, a resistor R2, a resistor R3, a resistor R4, a transistor MN4, and a transistor MN5. The band gap core circuit 2B is configured in the same way as the band gap core circuit 2A shown in FIG. 5, and functions in the same manner as the band gap core circuit 2A.

The startup circuit 3B is intended to start up the band gap core circuit 2B to prevent the band gap core circuit 2B from entering the above-mentioned state (1) in which no current flows through the band gap core circuit 2B. The startup circuit 3B is configured so as to include a resistor R5, a transistor MP4, a transistor MP5, a transistor MP6, a transistor MN1, a transistor MN2, and a transistor MN3. More specifically, the startup circuit 3B is configured in the same way as the startup circuit 3, and functions in the same manner as the startup circuit 3.

Further, the startup circuit 3B functions as a switch control circuit which turns off both the transistors MN4 and MN5 before currents flowing through the band gap core circuit 2B converge at a time of a startup of a power supply, and which turns on both the transistors MN4 and MN5 after the currents flowing through the band gap core circuit 2B converge at a time of a startup of the power supply.

For example, a gate terminal of the transistor MP6 in the startup circuit 3B is connected to each of gate terminals of the transistors MN4 and MN5.

The startup circuit 3B monitors the currents flowing through the band gap core circuit 2B, and turns off both the transistors MN4 and MN5 before the currents $(I_{1a}+I_{1b})$ and $(I_{2a}+I_{2b})$ flowing through the band gap core circuit 2B converge at a time of a startup of the power supply. Then, after the currents $(I_{1a}+I_{1b})$ and $(I_{2a}+I_{2b})$ flowing through the band gap core circuit 2B converge at a time of a startup of the power supply, the startup circuit 3B turns on both the transistors MN4 and MN5. As a result, the band gap power supply circuit 1B can become the state (3) without passing through the state (2), before a rise of the power supply voltage VDD is complete.

The configuration of the startup circuit 3B shown in FIG. 6 is an example, and the startup circuit may have a configuration different from that shown in FIG. 6 as long as the startup circuit can start up the band gap core circuit 2B.

Further, although the configuration in which the operational amplifier OP1 is used in the band gap core circuit 2B is shown, a self-biased current mirror circuit explained in Embodiment 1 may be used instead of the operational amplifier OP1.

Further, the diodes D1 and D2 may be PNP bipolar junction transistors.

As mentioned above, the band gap power supply circuit 1B according to Embodiment 3 includes the startup circuit 3B which functions as the switch control circuit 4. The startup circuit 3B turns off both the switches SW1 and SW2 before the currents flowing through the band gap core circuit 2B converge at a time of a startup of the power supply, and which turns on both the switches SW1 and SW2 after the currents flowing through the band gap core circuit 2B converge at a time of a startup of the power supply. As a result, the band gap power supply circuit 1B can make a transition to a normal operation state without passing through an abnormal operation state.

It is to be understood that a combination of embodiments can be made, a change can be made to an arbitrary component in each of the embodiments, or an arbitrary component in each of the embodiments can be omitted.

INDUSTRIAL APPLICABILITY

The band gap power supply circuit according to the present disclosure can be used in, for example, various types of LSIs.

REFERENCE SIGNS LIST 1, 1A, and 1B: Band gap power supply circuit; 2, 2A, and 2B: Band gap core circuit, 3, 3A, and 3B: Startup circuit, 4: Switch control circuit, C1: Capacitor, D1, D2: Diode, MP1 to MP6, and MN1 to MN5: Transistor, R1 to R6: Resistor, SW1 and SW2: Switch, VDD: Power supply voltage, and VSS: Ground potential.

What is claimed is:

1. A band gap power supply circuit comprising:

a band gap core circuit having a first switch to make up a first current path in which a first resistor is connected in series to the first switch, and to turn on and off an electrical connection between the first resistor and a ground potential, a first rectifier element connected in parallel to the first current path, a second switch to make up a second current path in which a second resistor is connected in series to the second switch, and to turn on and off an electrical connection between the second resistor and the ground potential, and a second rectifier element to make up a current path in which a third resistor is connected in series to the second rectifier element, the current path being connected in parallel to the second current path, to perform control in such a way that a sum of a current flowing through the first rectifier element and a current flowing through the first current path becomes equal to a sum of a current flowing through the second rectifier element and a current flowing through the second current path, and a sum of a forward direction voltage of the second rectifier element and a voltage drop across the third resistor becomes equal to a forward direction voltage of the first rectifier element; and a switch control circuit to control the first switch and the second switch from off to on at a time of a startup of a power supply to supply a power supply voltage.

2. The band gap power supply circuit according to claim 1, wherein the band gap core circuit includes a differential amplifier circuit, and first, second and third transistors each of which has a control terminal connected to an output terminal of the differential amplifier circuit, a first terminal to which the power supply voltage is supplied, and a second terminal, and in each of which an electrical connection between the first terminal and the second terminal is made by a control voltage applied to the control terminal, and wherein the first rectifier element is a first diode having an anode terminal which is connected to a positive input terminal of the differential amplifier circuit and the second terminal of the first transistor, and a cathode terminal which is made to have the ground potential, the first current path is connected in parallel to the first rectifier element, between the positive input terminal of the differential amplifier circuit and the ground potential, the second current path is disposed between a negative input terminal of the differential amplifier circuit and the ground potential, and the second rectifier element is a second diode having an anode terminal which is connected, via the third resistor, to the negative input terminal of the differential amplifier circuit and the second terminal of the second transistor, and a cathode terminal which is made to have the ground potential.

3. The band gap power supply circuit according to claim 1, wherein the switch control circuit turns off both the first switch and the second switch before a rise of the power supply voltage is complete at a time of a startup of the power supply, and turns on both the first switch and the second switch after a rise of the power supply voltage is complete at a time of a startup of the power supply.

4. The band gap power supply circuit according to claim 3, wherein the switch control circuit is a low pass filter to which the power supply voltage is inputted, and the low pass filter performs on/off control on the first switch and the second switch using an output signal.

5. The band gap power supply circuit according to claim 1, wherein the switch control circuit turns off both the first switch and the second switch before a current flowing through the band gap core circuit converges at a time of a startup of the power supply, and turns on both the first switch and the second switch after the current flowing through the band gap core circuit converges at a time of a startup of the power supply.

* * * * *